July 23, 1963 H. E. BEARSS 3,098,336
LEAD HALTER
Filed July 13, 1962
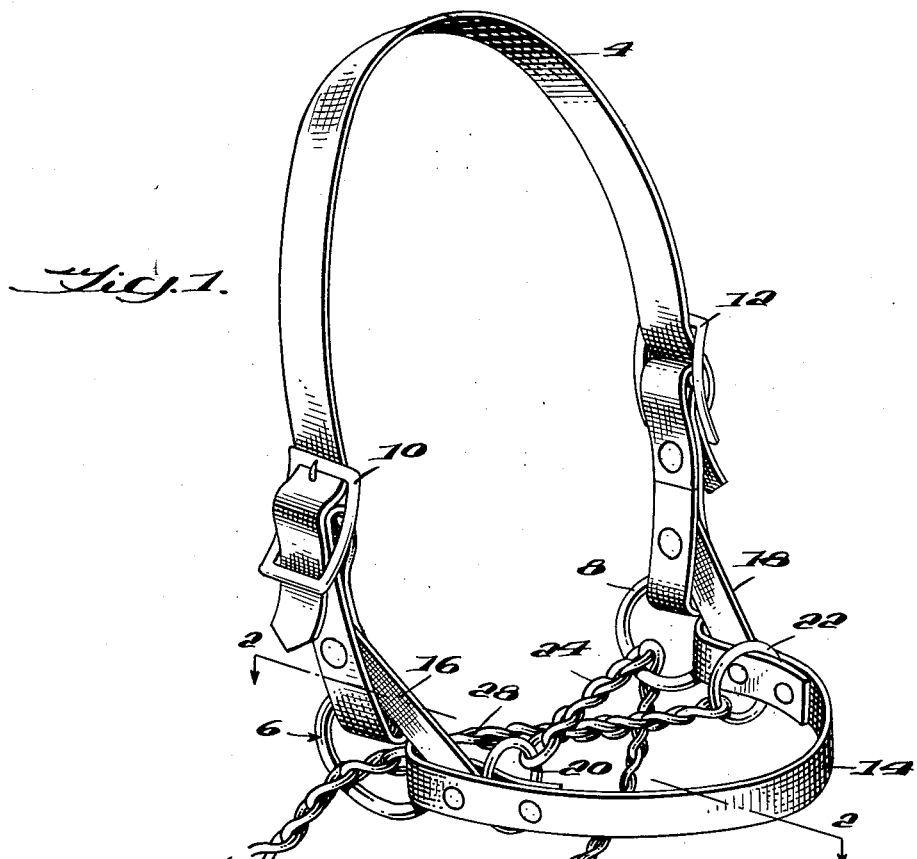
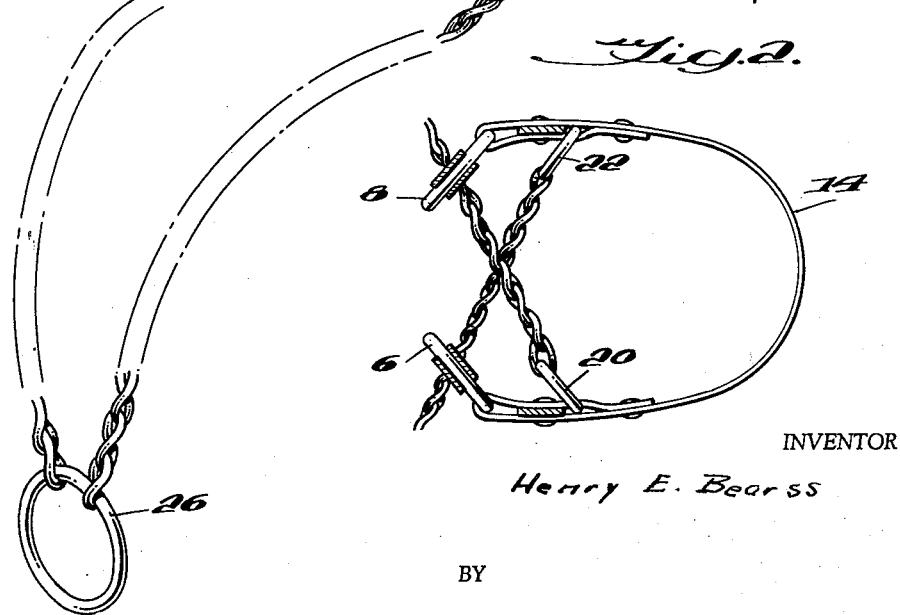
INVENTOR
Henry E. Bearss
BY
ATTORNEY

United States Patent Office 3,098,336
Patented July 23, 1963

1

3,098,336
LEAD HALTER
Henry E. Bearss, Minonk, Ill., assignor of one-third each to Lawrence A. Bearss, Minonk, and Robert E. Bearss, Sterling, Ill.
Filed July 13, 1962, Ser. No. 209,657
2 Claims. (Cl. 54—24)

The present invention relates to halters and more particularly to a breaking and lead halter for cattle.

Lead halters which are placed over the nose of an animal and adapted to exert a clamping action on the nose of the animal when the animal pulls back on the leash are well known in the art.

It is one of the objects of the present invention to provide in a lead halter of this general type, a halter in which the pressure is exerted under the lower jaw of the animal.

Another object of the invention is to provide in a halter of this general type a novel construction for effecting this under the jaw pressure which will enable the attendant of the animal to apply a uniform pressure to the under portion of the lower jaw or by virtue of its construction to enable the attendant to exert a right or left pressure under the lower jaw of the animal. It will be observed that this uniform, under the lower jaw pressure is effective in the straight path leading of the animal while the application of pressure on either the left or right of the lower portion of the jaw enables the animal to be led or directed to that particular side.

Other objects of the invention is to provide a lead halter having under the lower jaw pressure applying means which is extremely simple, easy to apply to the animal and relatively economical to manufacture.

This invention possesses many other advantages and has other advantages and has other objects which may be made more easily apparent from a consideration of one embodiment of the invention. For this purpose there is shown a form in the drawing accompanying and forming part of the present specification. This form will now be described in detail, illustrating the general principles of the invention: but it is to be understood that this detailed description is not to be taken in a limiting sense since the scope of the invention is best defined by the appended claims.

In the drawing:

FIG. 1 is a perspective view of the invention, and FIG. 2 is a partial and sectional view of FIG. 1, taken on line 2—2.

Referring now to the accompanying drawing there is provided a strap 4 which is adapted to pass over the head and behind the ears of the animal.

The ends of the strap 4 are looped on themselves around rings 6 and 8 and the strap is adjustable around the head of the animal by means of the buckles 10 and 12.

A nose encircling strap 14 has its ends looped around the rings 6 and 8. The head strap 4 and the nose encircling strap 14 are held in the proper spaced relation to provide for the strap 4 to engage the head of the animal behind the ears and the strap 14 to encircle the animals nose by means of the straps 16 and 18. The straps 16 and 18 have their ends terminating in the loops of the straps 4 and 14 and are held there in place by rivets.

Rings 20 and 22 are secured in the loops of strap 14

2 and are directed inwardly of strap 14. It is to be noted that rings 20 and 22 are secured in the loops of strap 14 so that they are in spaced relation respectively to the rings 6 and 8.

One end of a chain 24 is secured to ring 20 and is adapted to extend under the lower jaw of the animal and is passed outwardly through the ring 8 and has its other end connected to a ring 26 which is adapted to have a lead rope connected thereto.

Another chain 28 has one end connected to ring 22 crosses chain 24 is adapted to extend under the lower jaw of the animal and is passed outwardly through the ring 6 and has its end connected to the ring 26.

It will be observed that the positioning of the rings 20 and 22 to which the chains 24 and 28 are connected, in spaced relation respectively to the rings 6 and 8 and the crossing of the chains 24 and 28 in training them outwardly through the rings 6 and 8 respectively, provides for scissor like action of the chains, thereby exerting pressure under the lower jaw of the animal.

This scissor like action of the chains depending on the direction of pull of the ring 22 provides for a uniform pressure on the under portion of the lower jaw of the animal when it is pulled forwardly and for the exertion of pressure under the lower jaw on either the right or left side thereof when the ring is pulled to either the right or left of the animal.

While a specific form of the improvement has been described and illustrated herein, it is desired to be understood that the same may be varied, within the scope of the appended claims, without departing from the spirit of the invention.

Having thus described the invention, what is claimed is:

1. A lead halter for domestic animals which comprises an inverted U-shaped head strap, a pair of head strap rings one of which is secured to each end of said head strap, a forwardly extending U-shaped nose strap one end of which is secured to one of said head strap rings and the other end of which is secured to the other of said head strap rings, a pair of nose strap rings permanently secured in fixed position to said nose strap in spaced relation to each other one of which is disposed in spaced relation to the said one of said head strap rings and the other of which is disposed in spaced relation to the said other of said head strap rings, a pair of crossing chains one of which extends through the said other of said head strap rings and is connected to the said one of said nose strap rings and the other of which extends through the said one of said head strap rings and is connected to the said other of said nose strap rings, the free ends of said chains being connected to a connecting ring which is adapted to have a lead rope connected thereto.

2. A lead halter as defined by claim 1 in which a pair of diagonally disposed connecting straps is provided which are connected to and between contiguous sides of said head strap and said nose strap..

References Cited in the file of this patent
UNITED STATES PATENTS
896,164    Schreiter _____ Aug. 18, 1908

FOREIGN PATENTS
13,879    Great Britain _____ of 1905
37,501    Austria _____ June 11, 1909